(12) United States Patent
Kim (10) Patent No.: US 10,173,655 B2
(45) Date of Patent: Jan. 8, 2019

(54) MASTER CYLINDER FOR BRAKE SYSTEM

(71) Applicant: MANDO CORPORATION, Pyeongtaek-si, Gyeonggi-do (KR)

(72) Inventor: Jae-Yoon Kim, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 190 days.

(21) Appl. No.: 15/276,322

(22) Filed: Sep. 26, 2016

(65) Prior Publication Data
US 2017/0088107 A1    Mar. 30, 2017

(30) Foreign Application Priority Data

Sep. 25, 2015 (KR) ................. 10-2015-0136218

(51) Int. Cl.
*B60T 11/236* (2006.01)
*B60T 11/20* (2006.01)
*B60T 11/232* (2006.01)

(52) U.S. Cl.
CPC ............ *B60T 11/236* (2013.01); *B60T 11/20* (2013.01); *B60T 11/232* (2013.01)

(58) Field of Classification Search
CPC ..... B60T 11/228; B60T 11/232; B60T 11/236
See application file for complete search history.

(56) References Cited

U.S. PATENT DOCUMENTS

| 6,272,858 | B1 * | 8/2001 | Takano | B60T 11/20 60/588 |
| 8,156,740 | B2 * | 4/2012 | Bernadat | B60T 11/236 60/588 |
| 9,663,085 | B2 * | 5/2017 | Tanabe | B60T 11/236 |
| 2005/0115237 | A1 * | 6/2005 | Tsubouchi | B60T 11/22 60/562 |
| 2008/0022675 | A1 * | 1/2008 | Drott | B60T 11/16 60/588 |
| 2013/0213033 | A1 * | 8/2013 | Konig | B60T 11/101 60/533 |
| 2017/0106844 | A1 * | 4/2017 | Mun | B60T 11/236 |

FOREIGN PATENT DOCUMENTS

| JP | 2012076550 A | * | 4/2012 | ............ B60T 11/16 |
| JP | 2014100947 A | * | 6/2014 | ............ B60T 11/20 |
| KR | 10-2012-0047464 A | | 5/2012 | |

* cited by examiner

*Primary Examiner* — Michael Leslie
*Assistant Examiner* — Matthew Wiblin
(74) *Attorney, Agent, or Firm* — McDermott Will & Emery LLP

(57) ABSTRACT

Disclosed herein is a master cylinder for a brake system. The master cylinder for a brake system comprises a cylinder body in which a bore is formed, at least one piston provided to be movable forward and backward in the bore, a hydraulic chamber pressurized by the piston, an oil port connected to a reservoir and configured to supply oil to the hydraulic chamber of the cylinder body, and a sealing member installed in the cylinder body and configured to block a flow of oil between the oil port and the hydraulic chamber according to a movement of the piston, wherein the piston includes a piston groove having an inclined surface in contact with the sealing member and a plurality of piston holes formed along an outer circumferential surface of the piston groove configured to communicate the oil port with the hydraulic chamber.

9 Claims, 7 Drawing Sheets

【Fig. 1】

Forwad  Backward

MASTER CYLINDER FOR BRAKE SYSTEM

CROSS-REFERENCE TO RELATED APPLICATION

This application claims the benefit of Korean Patent Application No. 2015-0136218, filed on Sep. 25, 2015 in the Korean Intellectual Property Office, the disclosure of which is incorporated herein by reference.

BACKGROUND

1. Field

An embodiment of the present disclosure relates to a master cylinder for a brake system, and more particularly, to a master cylinder for a brake system capable of performing a stable braking operation and improving a feeling of braking.

2. Description of the Related Art

A master cylinder in a hydraulic brake system of a vehicle is an apparatus which generates a hydraulic pressure according to a driver stepping on a pedal and transfers the hydraulic pressure to a wheel brake installed at each wheel.

Such a master cylinder for a brake system was disclosed in Korean Laid-open Patent Application No. 10-2012-0047464. Referring to the disclosed document, the master cylinder includes a first piston and a second piston installed in series to be movable forward and backward in a bore of a cylinder body, and the bore is divided into a first hydraulic chamber and a second hydraulic chamber by the first piston and the second piston. In addition, the master cylinder includes oil ports connected to a reservoir provided above the cylinder body and configured to store oil to supply the oil to each of the hydraulic chambers.

A plurality of piston holes are formed in each of the first piston and the second piston such that oil is introduced into the first hydraulic chamber and the second hydraulic chamber which are connected to the oil ports communicating with the reservoir. Here, sealing members for sealing the pistons are installed at the cylinder body, and the sealing member performs a function of preventing the oil from being introduced into each of the hydraulic chambers when the piston moves.

Here, when the first piston and the second piston move forward, the oil ports and the plurality of piston holes are blocked by the sealing members, and hydraulic pressures of the first hydraulic chamber and the second hydraulic chamber increase. Here, since the hydraulic chambers are not sealed in piston moving sections from initial stand-by positions to positions at which the oil ports are closed, braking is not performed in this section. The section in which braking is not performed is referred to as a lost travel section. The reason why there is lost travel is to prevent a phenomenon in which a braking pressure is generated regardless of the driver's will due to backward movement of a caliper pad or a temperature increase of surroundings, for instance, a drag phenomenon in which a braking pressure is generated due to an abnormal expansion of a fluid in the hydraulic chamber.

Conversely, when the first piston and the second piston move backward, the plurality of piston holes move behind the sealing members and come into communication with the oil ports. Accordingly, oil of the first hydraulic chamber and oil of the second hydraulic chamber are returned to the reservoir, and the hydraulic pressures of first hydraulic chamber and the second hydraulic fall and a braking pressure is released.

However, when braking is performed using such a master cylinder, a pressure is applied to the sealing members according to increase of the pressures of the hydraulic chambers, and the sealing members are pressed against outer circumferential surfaces of the pistons. Here, when the braking is released, the piston holes are closed by the sealing members, the oil ports do not communicate with the hydraulic chambers, and thus a flow of the oil is blocked. Thus, there is a problem in that the release of braking is delayed.

Even though one of the plurality of piston holes is changed into an inclined hole and is used to solve such a problem, there is a problem in that the generation of a hydraulic pressure is delayed due to an increase of the lost travel section due to the inclined hole.

Meanwhile, even though piston grooves are formed in the pistons to increase an amount of oil supplied through the oil ports during braking, an amount of oil discharged through an effective diameter of the piston grooves which are smaller than the outer diameter of the piston is decreased because the piston grooves are formed, and thus there is a problem in that generation of an initial hydraulic pressure is reduced.

PRIOR ART

Patent Document

Korean Laid-open Patent Application No. 2012-0047464 (Halla Holdings Ltd. May 14, 2012)

SUMMARY

Therefore, it is an aspect of the present disclosure to provide a master cylinder for a brake system capable of minimizing a braking release delay by piston holes of pistons quickly communicating with oil ports of a reservoir and performing a stable braking operation by increasing a flow rate supplied to hydraulic chambers to improve a feeling of braking.

Additional aspects of the disclosure will be set forth in part in the description which follows and, in part, will be obvious from the description, or may be learned by practice of the disclosure.

In accordance with one aspect of the present disclosure, A master cylinder for a brake system, comprising: a cylinder body in which a bore is formed; at least one piston provided to be movable forward and backward in the bore; a hydraulic chamber pressurized by the piston; an oil port connected to a reservoir and configured to supply oil to the hydraulic chamber of the cylinder body; and a sealing member installed in the cylinder body and configured to block a flow of oil between the oil port and the hydraulic chamber according to a movement of the piston, wherein the piston includes a piston groove having an inclined surface in contact with the sealing member and a plurality of piston holes formed along an outer circumferential surface of the piston groove configured to communicate the oil port with the hydraulic chamber.

Also, the plurality of piston holes are formed in a portion in which the piston groove is formed; and the piston holes are positioned around the rear of the sealing member.

Also, the piston holes are formed in a polygonal shape or a polygonal shape with rounded corners whose area is greater than that of a circular shape of which diameter is the same length as a width of the polygonal shape.

Also, the oil port is formed to have an expanded path of which a diameter increases as the expanded path is close to the piston hole so as to increase a flow rate introduced into the piston hole.

Also, the expanded path is formed by concavely recessing a part of the cylinder body between an end portion of an accommodation groove in which the sealing member is accommodated and an inner surface of the oil port.

Also, the expanded path includes an inclined portion which connects a vicinity of an end portion of an accommodation groove in which the sealing member is accommodated and an inner surface of the oil port.

Also, the sealing member includes an outer wing in contact with the cylinder body and an inner wing in contact with an outer circumferential surface of the piston; and the inner wing is provided to be pressed against the inclined surface in a stand-by state before the piston operates.

Also, the piston groove includes a front inclined portion provided in a forward direction of the piston and a rear inclined portion provided in a backward direction of the piston; and a slope of the front inclined portion is greater than that of the rear inclined portion.

Also, the piston hole is provided in the rear inclined portion.

Also, the piston hole communicates with the oil port in a lost travel section of the piston and is provided to be sealed by the sealing member in the lost travel section.

Also, the sealing member is disposed in a front part of the piston hole; and a rear part of the piston hole communicates with the oil port in the lost travel section.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, an embodiment of the present disclosure will be described in detail with reference to the accompanying drawings. The embodiments are provided in order to fully explain the spirit and scope of the present disclosure for those skilled in the art. Thus, the present disclosure is not to be construed as limited to the embodiments set forth herein and may be accomplished in other various embodiments. Parts irrelevant to the description are omitted in the drawings in order to clearly explain the present disclosure. Sizes of the elements in the drawings may be exaggerated in order to facilitate understanding.

Figure 1:
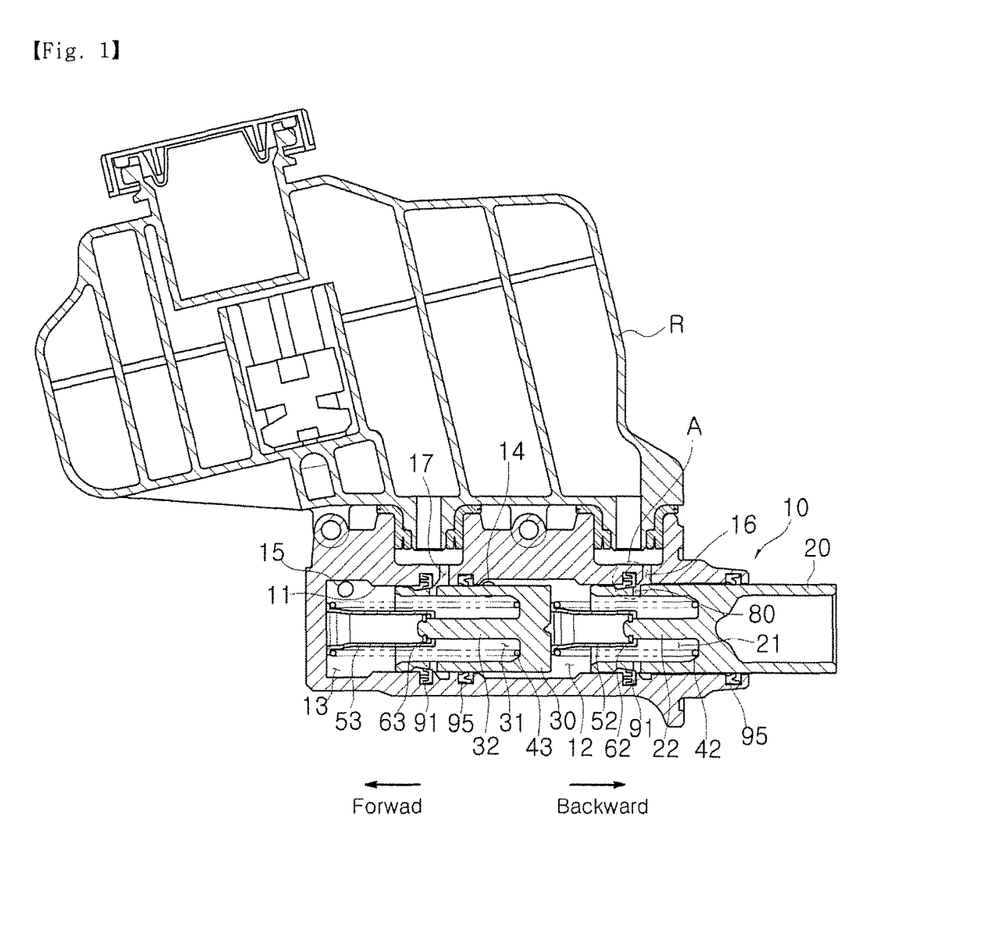
FIG. 1 is a cross-sectional view illustrating a master cylinder for a brake system according to one embodiment of the present disclosure.

FIG. 1 is a cross-sectional view illustrating a master cylinder for a brake system according to one embodiment of the present disclosure.

Referring to FIG. 1, a master cylinder for a brake system according to one embodiment of the present disclosure includes a cylinder body 10 in which a bore 11 is formed, first and second pistons 20 and 30 installed to be movable forward and backward in the bore 11 of the cylinder body 10, and sealing members 91 which seal between an inner side of the cylinder body 10 and outer sides of the first and second pistons 20 and 30.

The cylinder body 10 includes a first hydraulic chamber 12 formed between the first piston 20 and the second piston 30 and a second hydraulic chamber 13 formed between the second piston 30 and an inner surface of an end of the bore 11. In addition, first and second oil ports 16 and 17 connected to a reservoir R are formed in an upper portion of the cylinder body 10. The oil ports 16 and 17 respectively communicate with the first and second hydraulic chambers 12 and 13 through a plurality of piston holes 80 formed in the first and second pistons 20 and 30. Here, the first and second oil ports 16 and 17 are formed between the sealing members 91 and packing members 95.

Meanwhile, inside the cylinder body 10, a first oil outlet 14 is formed at a side of the first hydraulic chamber 12 and a second oil outlet 15 is formed at a side of the second hydraulic chamber 13 such that oil in the first and second hydraulic chambers 12 and 13 is discharged when the first and second hydraulic chambers 12 and 13 are respectively pressurized by the first and second pistons 20 and 30. The oil in the first and second hydraulic chambers 12 and 13 is discharged through the first and second oil outlets 14 and 15 to be supplied to a wheel brake (not shown) of each wheel.

The first and second pistons 20 and 30 are installed in series to be spaced a predetermined distance from each other in the cylinder bore 11 and move forward (in a left direction of the drawing), and braking hydraulic pressures are generated in the first and second hydraulic chambers 12 and 13.

First and second restoring springs 42 and 43 are respectively formed in the fronts of the first and second pistons 20 and 30 such that the first and second pistons 20 and 30 return to their original positions after finishing a braking operation in the first hydraulic chamber 12 and the second hydraulic chamber 13. To reduce an overall length of the master cylinder, the first and second pistons 20 and 30 respectively include spring accommodation grooves 21 and 31 such that the first and second restoring springs 42 and 43 are respectively accommodated in the first and second pistons 20 and 30.

Rod shaped first and second supporting portions 22 and 32 are respectively provided to protrude in the spring accommodation grooves 21 and 31 of the first and second pistons 20 and 30 such that a first retainer 52 and a second retainer 53 that respectively support the first and second restoring springs 42 and 43 are installed thereon. The first and second retainers 52 and 53 that respectively support the first and second restoring springs 42 and 43 are respectively inserted into the first and second supporting portions 22 and 32 to be reciprocal. Non-described reference numerals '62' and '63' are step rings which prevent the retainers 52 and 53 from leaving the first and second supporting portions 22 and 32. One ends of the first and second restoring springs 42 and 43 are respectively supported by the step rings 62 and 63 in the spring accommodation grooves 21 and 31 and the other ends are respectively supported by flange type ends of the retainers 52 and 53.

As the sealing members 91 and the packing members 95 are provided to seal the inner side of the cylinder body 10 and the outer sides of the first and second pistons 20 and 30 to prevent oil from leaking between an inner circumferential surface of the bore 11 and the first and second pistons 20 and 30 and to generate a high hydraulic pressure. Each of the sealing members 91 and the packing members 95 is formed in an accommodation groove 19 formed in an inner surface of the bore 11 such that the sealing members 91 and the packing members 95 do not move even when the first and second pistons 20 and 30 reciprocate.

Figure 3A:
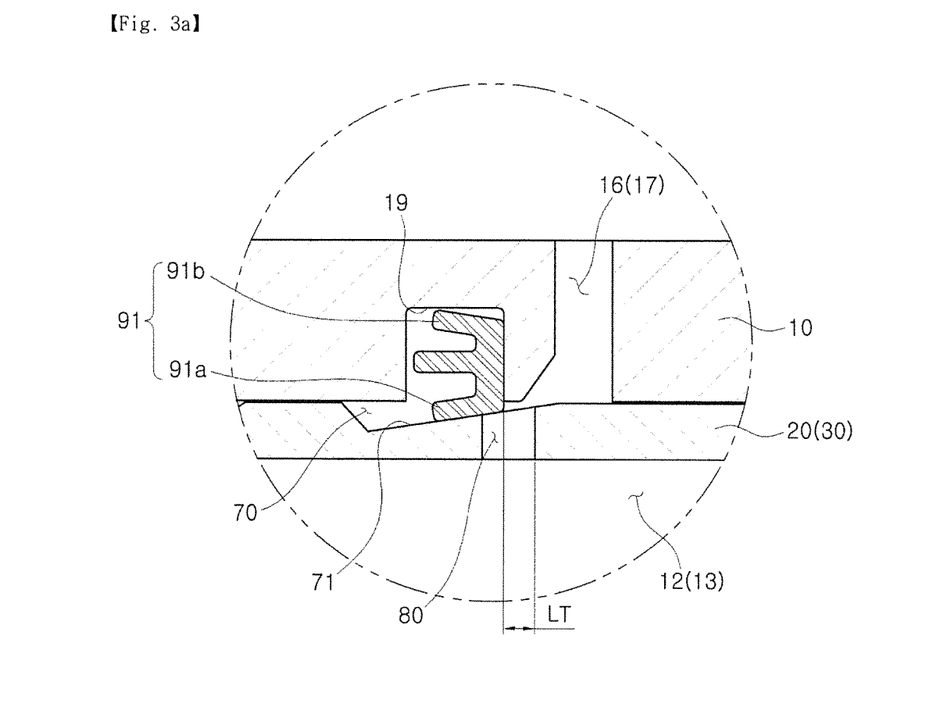
FIG. 3A is an exploded cross-sectional view illustrating portion A shown in FIG. 1.
Figure 3B:
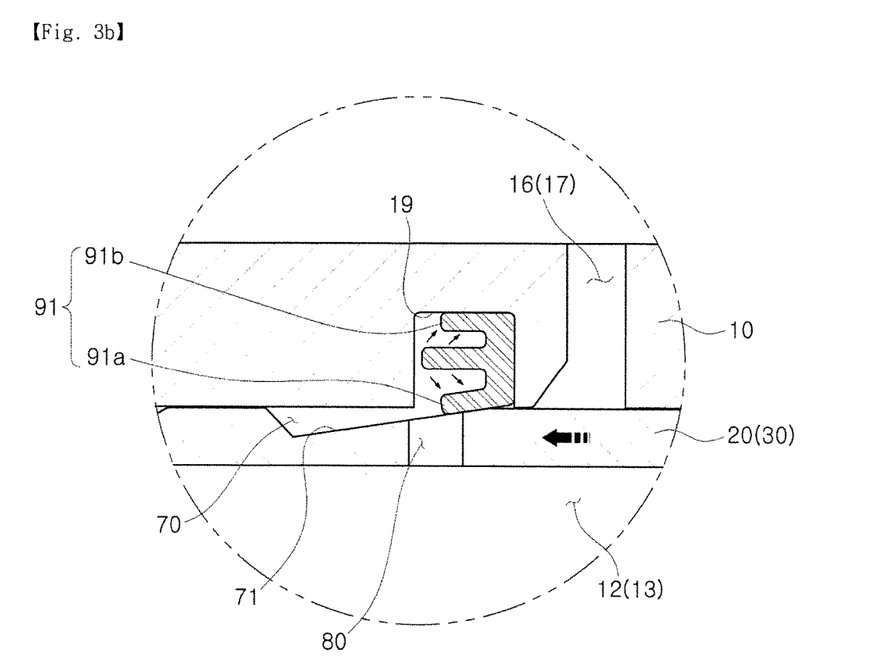
FIG. 3B is a cross-sectional view corresponding to FIG. 3A and illustrating a state in which the piston has moved forward.

As illustrated in FIG. 3A, each of the sealing members 91 includes an inner wing 91a in contact with each of outer surfaces of the first and second pistons 20 and 30 and an outer wing 91b in contact with each of inner surfaces of the accommodation grooves 19, and has a cross section in a cup shape. Here, the sealing member 91 optionally blocks an oil flowing through the plurality of piston holes 80, which will be described below, according to forward or backward movements of the first and second pistons 20 and 30, and as illustrated in FIG. 3B, when the plurality of piston holes 80 are blocked by the sealing members 91, hydraulic pressures in the first and second hydraulic chambers 12 and 13 increase.

Then, a structure which increases a hydraulic pressure and an amount of fluid discharged through the master cylinder when braking is performed or released and quickly releases the braking by facilitating the opening of the piston holes 80 will be described.

Figure 2:
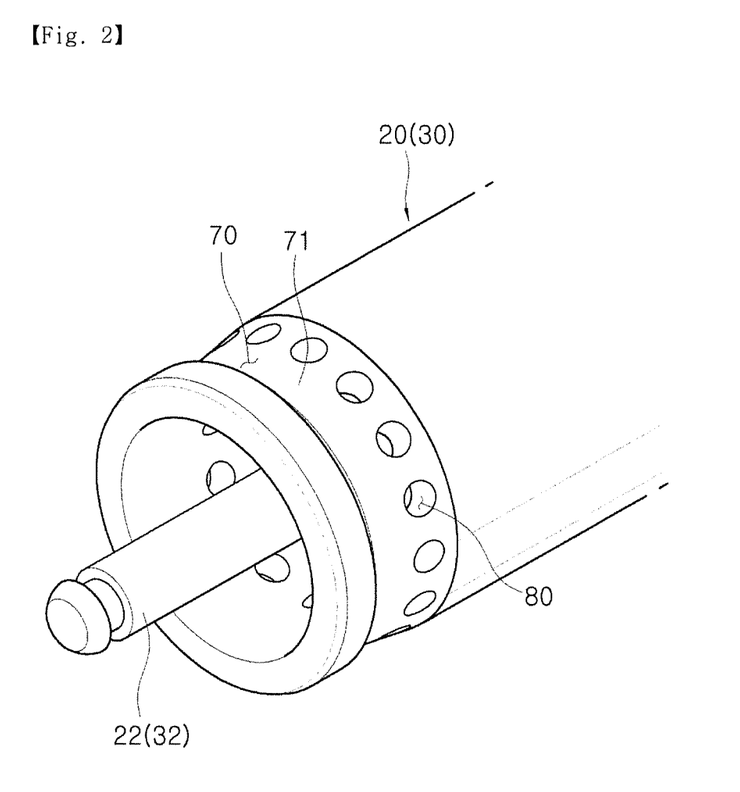
FIG. 2 is a perspective view illustrating a piston provided in a master cylinder for a brake system according to one embodiment of the present disclosure.
Figure 3C:
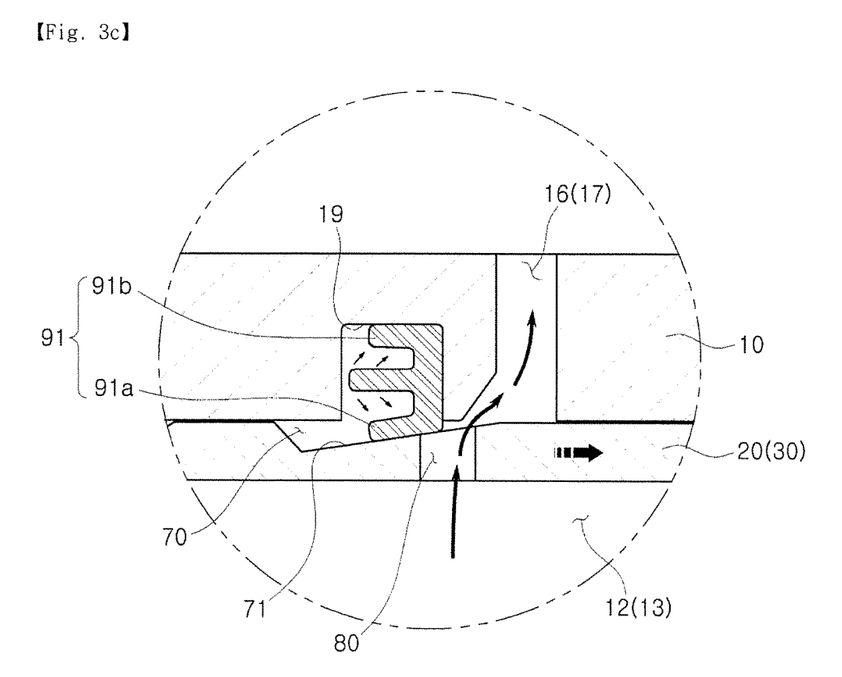
FIG. 3C is a cross-sectional view corresponding to FIG. 3A and illustrating a state in which the piston has moved backward.

FIG. 2 is a perspective view illustrating a piston provided in a master cylinder for a brake system according to one embodiment of the present disclosure. In addition, FIG. 3A is an exploded cross-sectional view illustrating portion A shown in FIG. 1, FIG. 3B is a cross-sectional view corresponding to FIG. 3A and illustrating a state in which the piston has moved forward, and FIG. 3C is a cross-sectional view corresponding to FIG. 3A and illustrating a state in which the piston has moved backward.

According to one embodiment of the present disclosure, as illustrated in FIGS. 2 and 3A, piston groove 70 is formed around each of the first piston 20 and the second piston 30, and the plurality of piston holes 80 are formed in a portion in which the piston groove 70 is formed. More specifically, the piston groove 70 is formed in a 'v' shape having an inclined surface 71 around each of the first and second pistons 20 and 30. Here, the inclined surface 71 has an inclined straight surface in an inclined direction. Here, the inner wing 91a of the sealing member 91 is provided to be pressed against the inclined surface 71. That is, as a gap between the outer surface of each of the pistons 20 and 30 and the sealing member 91 is decreased compared with an existing case, a decrease of a discharged hydraulic pressure is prevented when the pistons 20 and 30 move. As the piston groove 70 is formed to have the inclined surface 71, the plurality of piston holes 80 are formed to be positioned at a rear portion of the piston groove 70, that is, around a rear of the sealing member 91. Accordingly, as distances between the piston holes 80 and flow paths at the reservoir R, that is, distances from the piston holes 80 to the oil ports 16 and 17, are decreased, resistance of a flow of fluid may be decreased.

Referring to FIG. 3B, when the first and second pistons 20 and 30, in which the piston holes 80 are formed, move forward, the sealing members 91 maintain states of being pressed against the outer surfaces of the pistons 20 and 30 to perform sealing functions. Here, as a size of an area through which hydraulic pressures are discharged via each of the hydraulic chambers 12 and 13 is increased after a lost travel section (see 'LT section' in FIG. 3A) according to forward movements of the first and second pistons 20 and 30, hydraulic pressure increasing efficiency is increased compared with an existing case. That is, when the first and second pistons 20 and 30 move forward, the plurality of piston holes 80 are blocked by the sealing members 91, and thus pressures of the first and second hydraulic chambers 12 and 13 are increased. Such pressures are applied to the sealing members 91 and the inner surfaces of the accommodation grooves 19, and thus cross sections of the sealing members 91 are deformed.

Meanwhile, the first and second pistons 20 and 30 move to their initial stand-by positions when braking is released. Here, as illustrated in FIG. 3C, because the piston holes 80 are formed around the rear of the sealing members 91, the hydraulic chambers 12 and 13 respectively communicates with the oil ports 16 and 17 even when the sealing members 91 are deformed. That is, since the piston holes 80 are formed around the rear of the sealing members 91, a problem in that the piston holes are blocked due to a deformation of the sealing members may be essentially solved.

Meanwhile, although the plurality of piston holes 80 formed in the first and second pistons 20 and 30 have a circular shape, they are not limited thereto and may also be provided by changing shapes of the piston holes 80 to decrease resistance of a flow of fluid and improve a supply performance of a fluid.

Figure 4:
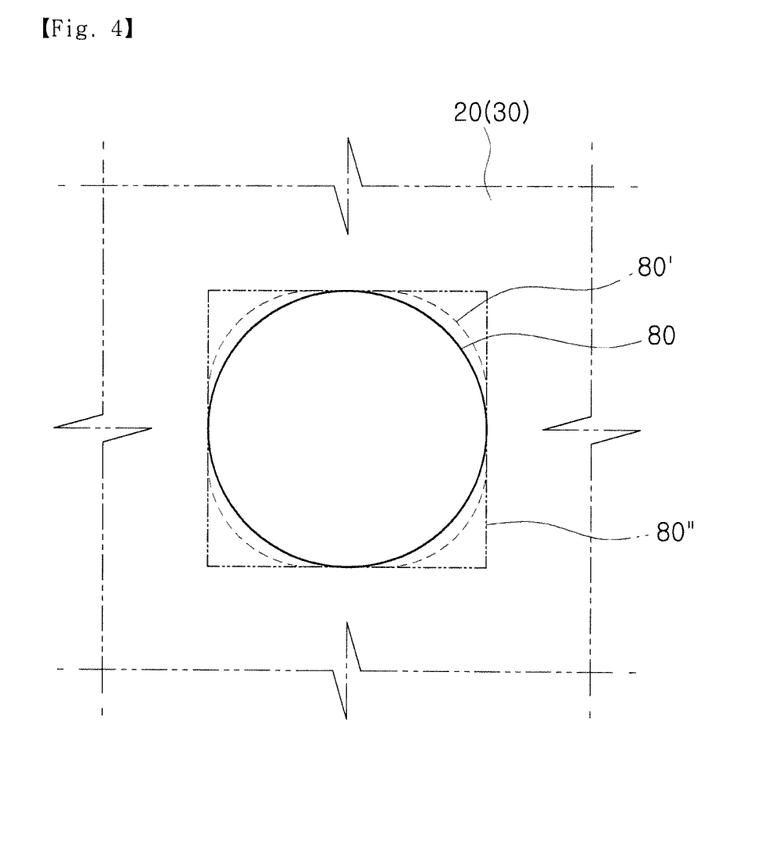
FIG. 4 is a partially exploded plan view illustrating a modified example of a piston hole formed in the master cylinder for a brake system according to one embodiment of the present disclosure.

FIG. 4 is a partially exploded plan view illustrating a modified example of a piston hole formed in the master cylinder for a brake system according to one embodiment of the present disclosure.

According to one embodiment of the present disclosure, the plurality of piston holes 80 may have a polygonal shape or a polygonal shape with rounded corners whose areas are greater than that of a circular shape such that a passing time of oil is reduced. For example, as illustrated in FIG. 4, the plurality of piston holes 80 formed in the first and second pistons 20 and 30 may be formed as piston holes 80' in a rectangular shape with rounded corners or as piston holes 80" in a rectangular shape. That is, the piston holes 80' in a rectangular shape with rounded corners or the piston holes 80" in a rectangular shape may be optionally formed and used for the first and second pistons 20 and 30. The reason why the shape of the piston hole 80 is changed is for increasing an area through which oil passes to reduce resistance of a flow of fluid so that a performance of a flow rate of the fluid is improved. According to one embodiment of the present disclosure, the shape of the piston hole 80 is changed not to increase the area simply through increasing the diameter of the piston hole 80, but to increase an area to be greater than that of a circular shape using a polygonal shape having the same diameter as that of the existing circular shape. For example, when the circular shaped piston hole 80 has a diameter of 2 mm, the piston hole 80 has an area of 3.14 mm$^2$ according to the formula of $(\pi/4) \times 2^2$. Conversely, the rectangular shaped piston hole 80" has an area of 4 mm$^2$ according to 2 mm×2 mm. Thus, the area of the rectangular shaped piston hole 80" is increased by 27% in regards to the area of the circular shaped piston hole 80.

In addition, according to one embodiment of the present disclosure, a supply performance of a fluid may also be improved by changing diameters of the first and second oil ports 16 and 17.

Figure 5:
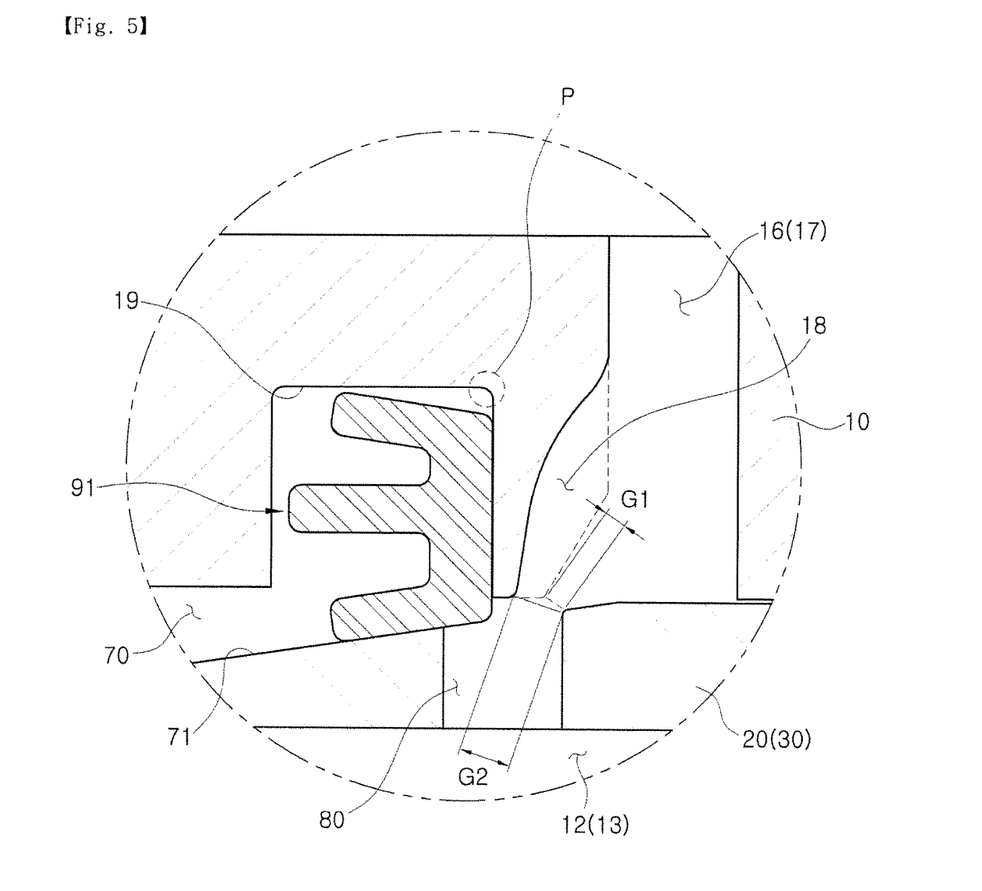
FIG. 5 is a view of a state in which a modified example of an expanded flow path of an oil port of a master cylinder for a brake system according to one embodiment of the present disclosure is compared with a flow path of an existing oil port.

FIG. 5 is a view of a state in which a modified example of an expanded flow path of an oil port of a master cylinder for a brake system according to one embodiment of the present disclosure is compared with a flow path of an existing oil port.

Referring to FIG. 5, an expanded path 18 in which a diameter of each of the oil ports 16 and 17 is increased is formed in each of the oil ports 16 and 17 such that an amount of fluid introduced into the piston hole 80 is increased. The expanded path 18 is formed by concavely recessing a part of the cylinder body 10 between an end portion of the accommodation groove 19 in which the sealing member 91 is accommodated and each of inner surfaces of the oil ports 16 and 17. Here, the reason why the expanded path 18 is concavely formed between the end portion of the accommodation groove 19 and each of the inner surfaces of the oil ports 16 and 17 is to increase a gap between an outlet of each of the oil ports 16 and 17 and an inlet of the piston hole 80 and to prevent the accommodation groove 19 from breaking when a hydraulic pressure of each of the hydraulic chambers 12 and 13 is increased. That is, since portion P in FIG. 5 is a portion in which breakage may occur due to pressure when a high pressure is generated, a thickness of the portion P is maintained while expanding the flow path. Here, as a flow gap G1 between each of the existing oil ports 16 and 17 and the piston hole 80 is increased to a gap G2 between the expanded path 18 and the piston hole 80, a supply performance of a fluid is improved.

According to such a master cylinder for a brake system, as the piston groove 70 having the inclined surface in each of the first and second pistons 20 and 30 and the plurality of piston holes 80 around the rear of the sealing member 91 are formed, problems due to a reduction of a discharged hydraulic pressure, blockage of the piston hole by the sealing member, and the like may be solved when braking is released. In addition, a structure in which the piston hole 80' or 80" or the expanded path 18 having modified shapes may be selectively adopted and used in the master cylinder to improve a performance of the master cylinder according to one embodiment of the present disclosure.

As is apparent from the above description, the master cylinder for a brake system in accordance with one embodiment of the present disclosure has an effect in which closing of piston holes is minimized when braking is released, a shape of piston and positions of piston holes are changed to effectively discharge pressures of hydraulic chambers through the piston holes, opening of the piston holes is facilitated, and thus braking is quickly released. Accordingly, a drag phenomenon in which a braking pressure is generated regardless of the driver's could be effectively prevented.

In addition, as piston holes are positioned around the rear of sealing members, there is an effect in which a hydraulic pressure increasing efficiency and a discharged amount of a hydraulic pressure are increased after a lost travel section. In addition, as distances between piston holes and hydraulic ports are decreased compared with an existing case, resistance of a flow of fluid is decreased, and thus a performance of a flow rate of the fluid is increased.

Furthermore, as a shape of piston holes is changed and flow paths of oil ports are extended, a performance of a flow rate of fluid is increased, and thus a feeling of braking is improved. Accordingly, as the oil quickly and stably flows when braking is performed or released, a stable braking operation can be performed.

As described above, while the present disclosure has been described with reference to specific embodiments and drawings, the present disclosure is not limited thereto. It should be clear to those skilled in the art that various modifications and alterations may be made without departing from the spirit and scope of the present disclosure and equivalents of the appended claims.

| [Reference Numerals] | |
| --- | --- |
| 10: CYLINDER BODY | 11: BORE |
| 16: FIRST OIL PORT | 17: SECOND OIL PORT |
| 18: EXPANDED PATH | 19: ACCOMMODATION GROOVE |
| 20: FIRST PISTON | 30: SECOND PISTON |
| 70: PISTON GROOVE | 71: THE INCLINED SURFACE |
| 80, 80', 80": PISTON HOLE | 91: SEALING MEMBER |

What is claimed is:

1. A master cylinder for a brake system, comprising: a cylinder body in which a bore is formed;
   at least one piston provided to be movable forward and backward in the bore; a hydraulic chamber pressurized by the at least one piston; an oil port connected to a reservoir and configured to supply oil to the hydraulic chamber of the cylinder body; and
   a sealing member installed in the cylinder body and configured to block a flow of oil between the oil port and the hydraulic chamber according to a movement of the at least one piston,
   wherein the at least one piston includes a piston groove having an inclined surface in contact with the sealing member and a plurality of piston holes formed along an outer circumferential surface of the piston groove configured to communicate the oil port with the hydraulic chamber, and
   wherein the oil port has an expanded path, of which a diameter in an axial direction of
   the at least one piston increases as the expanded path approaches the plurality of piston holes
   so as to increase a flow rate introduced into the plurality of piston holes
   wherein the expanded path is formed by concavely recessing an end portion of an inner surface of the oil port in the axial direction of the at least one piston.

2. The master cylinder of claim 1, wherein:
   the plurality of piston holes are formed in a portion in which the piston groove is formed.

3. The master cylinder of claim 1, wherein the plurality of piston holes are formed in a polygonal shape or a polygonal shape with rounded corners, an area of the polygonal shape or polygonal shape with rounded corners is greater than an area of a circular shape having a diameter equal in length to a width of the polygonal shape.

4. The master cylinder of claim 1, wherein the expanded path includes an inclined portion with respect to the axial direction of the at least one piston, which connects a vicinity of an end portion of an accommodation groove in which the sealing member is accommodated and an inner surface of the oil port.

5. The master cylinder of claim 1, wherein:
   the sealing member includes an outer wing in contact with the cylinder body and an inner wing in contact with an outer circumferential surface of the at least one piston; and the inner wing is provided to be pressed against the inclined surface in a stand-by state before the piston operates.

6. The master cylinder of claim 1, wherein:
the inclined surface of the piston groove includes a front inclined portion provided in a forward direction of the at least one piston and a rear inclined portion provided in a backward direction of the at least one piston; and
a slope of the front inclined portion is greater than a slope of the rear inclined portion.

7. The master cylinder of claim 6, wherein the plurality of piston holes are provided in the rear inclined portion.

8. The master cylinder of claim 1, wherein the plurality of piston holes communicate with the oil port in a lost travel section of the at least one piston and is provided to be partially sealed by the sealing member in the lost travel section.

9. The master cylinder of claim 8, wherein:
the sealing member is disposed in a front part of the plurality of piston holes; and
a rear part of the plurality of piston holes communicate with the oil port in the lost travel section.

* * * * *